Patented Feb. 20, 1951

2,542,396

UNITED STATES PATENT OFFICE 2,542,396

PROCESS FOR THE PRODUCTION OF CAFFEINE

Frederick Comte, Kirkwood, Mo., assignor to Monsanto Chemical Company, St. Louis, Mo., a corporation of Delaware No Drawing. Application May 20, 1949, Serial No. 94,500

7 Claims. (Cl. 260—256)

This invention relates to caffeine; more specifically this invention relates to an improved process for the production of caffeine.

Due to the increasing use of caffeine as a pharmaceutical, considerable interest has arisen in the development of a commercially feasible process for the synthesis of caffeine as a means of augmenting its natural supply. Various syntheses for the production of caffeine have been developed. While these syntheses are quite complex involving a considerable number of successive reactions, which vary substantively according to the starting materials utilized, eventually one reaction is reached which is common to all of the generally accepted methods for the production of caffeine. This reaction, commonly considered to be the last step in the synthesis of caffeine, is the methylation and ring closure of 4-amino-5-formamido uracil to form caffeine. This reaction may be structurally represented as follows:

The development of a commercially feasible process for the production of synthetic caffeine has been seriously hindered by the unavailability of a commercially feasible method for this methylation and ring closure of 4-amino-5-formamido uracil to form caffeine. Several methods have been described in the art, but all have inherent disadvantages.

The most frequently described method is that of methylating 4-amino-5-formamido uracil with an excess of methyl chloride under highly alkaline conditions and under extremely high pressures. Such a process, however, requires the use of costly pressure equipment which, in addition to being able to withstand the high pressure developed, must also be capable of resisting the highly corrosive action of the by-products formed in the reaction. The use of other alkyl halides is economically prohibitive and similar corrosive conditions are encountered. One of the most desirable methylating agents is dimethyl sulfate. Its low cost, availability, and ease of handling make it particularly attractive as a commercial methylating agent. However, attempts in the past to obtain caffeine by the methylation of 4-amino-5-formamido uracil and subsequent or simultaneous ring closure have not been too successful when dimethyl sulfate is utilized as the methylating agent. According to the methods heretofore used, methylation with dimethyl sulfate was found to be unique in that little control was had over the successive methylation reactions resulting in extremely low yields of caffeine.

It is an object of this invention to provide an improvement in the process for the production of caffeine.

It is a further object of this invention to provide an improved process for the production of caffeine from 4-amino-5-formamido uracil using dimethyl sulfate as a methylating agent.

Further objects will become apparent from the description of the novel process of this invention and the claims.

It has now been discovered that caffeine may be obtained in high yields by adding dimethyl sulfate, with continuous agitation, to an aqueous medium containing 4-amino-5-formamido uracil or its alkali metal salt while adding an aqueous alkaline solution so as to maintain the reaction mixture at a pH in the range of from about 9.0 to 10.0 and while maintaining a temperature in the range of from about 20° to 50° C., thereby obtaining a first reaction mixture containing 1,3-dimethyl-4-amino-5-formamido uracil, heating said first reaction mixture to a temperature in the range of from about 70° to 95° C., while maintaining the pH in excess of about 10.5 by the addition of an alkali metal hydroxide to obtain a second reaction mixture containing the alkali metal salt of theophylline, adding dimethyl sulfate to the second reaction mixture while adding an aqueous alkaline solution so as to maintain the reaction mixture at a pH in the range of from about 8.0 to 10.5 and while maintaining a temperature in the range of from about 20° to 70° C. and recovering therefrom substantially pure caffeine.

In carrying out the novel process of this invention, it is preferred that the temperatures of reactions be maintained within the ranges hereinbefore specified. Thus, in the preparation of 1,3-dimethyl-4-amino-5-formamido uracil, it is preferred that the temperature be maintained within the range of from about 20° to 50° C.; in the preparation of the alkali metal salt of theophylline, it is preferred that the temperature be maintained within the range of from about 70° C. to about 95° C.; in the preparation of caffeine by the methylation of theophylline, it is preferred that the temperature be maintained in the range of from about 20° to 70° C. Temperatures lower than the prescribed ranges retard the rate of reaction thereby producing considerably longer time cycles; while temperatures in excess of the prescribed ranges tend to produce undesirable side reactions which cause a decrease in the yield of caffeine.

It is, of course, desirable to have as high a concentration as possible of the 4-amino-5-formamido uracil or its alkali metal salt in the initial aqueous suspension in order to obtain maximum yield per cycle. Inasmuch as the solubility limit of either of these materials may be exceeded so that the reaction medium is part suspension and part solution, the concentration utilized is governed chiefly by the viscosity of the resultant suspension which will permit sufficient agitation. This, in turn, will be governed by the temperature of the reaction, and the nature of the equipment and means of agitation. It has been found that concentrations in excess of about 25% by weight of the 4-amino-5-formamido uracil generally produce suspensions which are too thick to agitate efficiently with ordinary equipment.

Either the 4-amino-5-formamido uracil or its alkali metal salt may be utilized in this reaction. The alkali metal salt may be conveniently prepared by merely reacting a 1 molecular proportion of the 4-amino-5-formamido uracil with an approximately 1 molecular proportion of an alkali metal hydroxide in an aqueous medium.

In carrying out these methylation reactions, it is essential that the dimethyl sulfate and the aqueous alkaline solution be added simultaneously and at such a rate so as to maintain the pH of the reaction mixture during the preparation of 1,3-dimethyl-4-amino-5-formamido uracil in the range of from about 9.0 to 10.0, and in the methylation of the alkali metal salt of theophylline to form caffeine, in the range of from about 8.0 to 10.5. Lower pH conditions significantly decrease the rate of the reaction, while higher pH conditions cause the formation of undesirable by-products. Obviously, the rate of addition of the dimethyl sulfate and the aqueous alkaline solution need not, and probably will not, be identical. The expression "simultaneous addition" is used in its practical sense rather than its literal sense, meaning the addition of an alkaline solution to the reaction mixture during the methylation reaction which has taken place during the addition of the dimethyl sulfate in such a manner and rate to maintain the pH in the prescribed range. Thus, it is possible for the addition of the alkaline solution to be at times intermittent, rather than continuous, as long as the pH is maintained in the prescribed range.

The pH of the reaction mixture may be ascertained by any of the convenient methods well known to those skilled in the art, with probably the most practical method being by the means of continuous potentiometric measurement.

In order to particularly prescribe the nature of the aqueous alkaline solution utilized in this reaction, and the quantity of reactants, it is necessary to consider the theoretical aspects of the reactions that take place. When dimethyl sulfate, $(CH_3)_2SO_4$, is added to 4-amino-5-formamido uracil, 1 methyl group of the dimethyl sulfate attaches to the uracil ring and the methyl acid sulfate, $CH_3HSO_4$, remains. Thus, to form the dimethyl substituted 4-amino-5-formamido uracil, there would theoretically be necessary the addition of 2 molecular proportions of dimethyl sulfate for each molecular proportion of 4-amino-5-formamido uracil, thereby forming 2 molecular proportions of methyl acid sulfate. This material is very highly acidic and must be neutralized by the addition of an alkaline solution to raise the pH into the aforementioned range in order that the reaction may proceed. However, the addition of an alkaline solution promotes the hydrolysis of dimethyl sulfate, thereby decreasing the amount of dimethyl sulfate available for the methylation of the uracil ring. Consequently, an excess of dimethyl sulfate over the theoretical 2 molecular proportions must be utilized to obtain satisfactory yields. The amount of the excess of dimethyl sulfate is necessarily dependent to a great extent on the reaction conditions within the prescribed limits. It has been found that generally from about 20% to about 50% dimethyl sulfate over the theoretical 2 molecular proportions for each 1 molecular proportion of 4-amino-5-formamido uracil is preferred. For similar theoretical reasons, it has been found that generally from about 20% to about 50% excess dimethyl sulfate over the theoretical 1 molecular proportion for each 1 molecular proportion of 4-amino-5-formamido uracil is preferred in the last methylation step, which comprises the methylation of the alkali metal salt of theophylline to form caffeine.

Inasmuch as the methyl acid sulfate formed in these reactions is highly acidic, it is preferred that the alkaline solution also be strongly alkaline for practical purposes. Thus, aqueous solutions of sodium hydroxide, potassium hydroxide or ammonia are preferred; however, other alkaline solutions, such as a solution of sodium carbonate, may be used, but are not too desirable. The concentration of such solutions may be varied over a wide range. The highest concentrations that still permit accurate pH control are preferred, as less volume of solution is necessary. Aqueous alkaline solutions containing from about 20% to about 50% of the alkali metal hydroxides have been found to be quite advantageous, because of their obvious economical advantages and ease of handling.

Inasmuch as a relatively high pH is necessary, that is in excess of about 10.5, in the conversion of 1,3-dimethyl-4-amino-5-formamido uracil to the alkali metal salt of theophylline, it is preferred that the pH be controlled by means of highly alkaline materials, such as the alkali metal hydroxides. The alkali metal hydroxides, such as sodium or potassium hydroxide, may be added as an aqueous solution or as the solid hydroxide. Heating 1,3-dimethyl-4-amino-5-formamido uracil to a temperature of from about 70° to 95° C. while maintaining the pH in excess of about 10.5, causes the formation of theophylline. Theophylline being acidic, reacts with the alkali metal hydroxide to form the alkali metal salt of the theophylline which reaction in turn, causes a reduction in the pH of the reaction mixture. Therefore, about a one molecular proportion of the alkali metal hydroxide should be added for each one molecular proportion of the 1,3-dimethyl-4-amino-5-formamido uracil or the 4-amino-5-formamido uracil initially utilized.

Caffeine produced by the novel process of this invention may be recovered and purified by any convenient method well known to those skilled in the art. Typical of such methods of purification is recrystallization from water.

The following examples are illustrative of the novel process of this invention:

*Example I*

51.0 g. of 4-amino-5-formamido uracil and 390 ml. of water were added to a liter beaker equipped with a stirrer and a thermometer. Over a period of about 1½ hours were added 85.5 ml. of dimethyl sulfate and 74 g. of a 48.7% sodium hydroxide solution, while continuously agitating the reaction mixture and maintaining a reaction temperature of about 35° C. The dimethyl sulfate and sodium hydroxide solution were added at such a rate so as to maintain a pH of about 10.0. After the reactants had been added, the reaction mixture was stirred for an additional 1½ hours while maintaining a temperature of about 35° C. This reaction mixture then contained 1,3-dimethyl-4-amino-5-formamido uracil.

The reaction mixture was then heated to about 90° C., and with continuous agitation, 25 g. of a 48.7% sodium hydroxide solution were added over a period of 1 hour, maintaining the reaction mixture at a pH of about 11.6. The reaction mixture then contained the sodium salt of theophylline.

The reaction mixture was then cooled to about 35° C., and, with constant agitation, over a period of about 1 hour, were added 34.0 ml. of dimethyl sulfate and about 6.5 g. of a 48.7% sodium hydroxide solution at such a rate so as to maintain a pH of about 9.0. After all the reactants had been added, the reaction mixture was heated to 95° C., about 1.0 g. of filtercel added, and the reaction mixture filtered. The filtrate was cooled to about 15° C., and the caffeine crystals filtered and washed with several portions of cold water. An additional quantity of caffeine was obtained by extracting the filtrate with several portions of chloroform which was then evaporated and the caffeine crystals recrystallized from water. A 77.6% yield of caffeine based on 4-amino-5-formamido uracil was obtained. The caffeine crystals had a melting point of 236.4° to 237.5° C.

*Example II*

34.0 g. of 4-amino-5-formamido uracil were added to 400 ml. of water having dissolved therein about 20 g. of a 40.5% potassium hydroxide solution. The temperature of this mixture was adjusted to about 35° C. With constant agitation, 55 ml. of dimethyl sulfate were slowly added to the reaction mixture while simultaneously adding about 41 g. of a 40.5% potassium hydroxide solution at such a rate as to maintain a pH in the reaction mixture of from about 9.0 to about 10.0.

After this reaction was completed, the reaction mixture was heated to about 85° C. and about 13 g. of solid potassium hydroxide added, thereby raising the pH of the reaction mixture to a pH in excess of 11.0.

The reaction mixture was then cooled to about 35° C., and over a period of about 1 hour were added about 28 ml. of dimethyl sulfate and a sufficient amount of a 40.5% potassium hydroxide solution to maintain a pH of about 9.0.

After all of the reactants had been added, an excellent yield of caffeine was recovered and purified in the manner described in Example I.

This application is a continuation in part of my copending application, Serial No. 78,885, filed February 28, 1949.

What is claimed is:

1. The process for the production of caffeine, comprising the addition with agitation of dimethyl sulfate to an aqueous medium containing a substituted uracil selected from the group consisting of 4-amino-5-formamido uracil and its alkali metal salts, in the ratio of at least 2 molecular proportions of the dimethyl sulfate per molecular proportion of the selected substituted uracil, while adding an aqueous alkaline solution, so as to maintain the reaction mixture at a pH within the range of from about 9.0 to 10.0 and a temperature in the range of from about 20° to 50° C., thereby obtaining a first reaction mixture containing 1,3-dimethyl-4-amino-5-formamido uracil, heating said first reaction mixture to a temperature in the range of from about 70° to about 95° C., while maintaining the pH in excess of about 10.5 by the addition of an alkali metal hydroxide in the ratio of approximately 1 molecular proportion of the alkali metal hydroxide per molecular proportion of the selected substituted uracil, thereby obtaining a second reaction mixture containing the alkali metal salt of theophylline, adding dimethyl sulfate to the said second reaction mixture in the ratio of at least 1 molecular proportion of dimethyl sulfate per 1 molecular proportion of the selected substituted uracil, while adding an aqueous alkaline solution so as to maintain the reaction mixture at a pH in the range of from about 8.0 to 10.5 and while maintaining a temperature in the range of from about 20° to 70° C., and recovering therefrom substantially pure caffeine.

2. In a process for the production of caffeine, the steps comprising the addition with agitation of dimethyl sulfate to an aqueous medium containing a substituted uracil selected from the group consisting of 4-amino-5-formamido uracil and its alkali metal salts, in the ratio of at least 2 molecular proportions of the dimethyl sulfate per molecular proportion of the selected substituted uracil, while adding an aqueous alkaline solution, so as to maintain the reaction mixture at a pH within the range of from about 9.0 to 10.0 and a temperature in the range of from about 20° to 50° C., thereby obtaining a first reaction mixture containing 1,3-dimethyl-4-amino-5-formamido uracil, heating said first reaction mixture to a temperature in the range of from about 70° to about 95° C., while maintaining the pH in excess of about 10.5 by the addition of an alkali metal hydroxide in the ratio of approximately 1 molecular proportion of the alkali metal hydroxide per molecular proportion of the selected substituted uracil, thereby obtaining a second reaction mixture containing the alkali metal salt of theophylline, adding dimethyl sulfate to the said second reaction mixture in the ratio of at least 1 molecular proportion of dimethyl sulfate per 1 molecular proportion of the selected substituted uracil, while adding an aqueous alkaline solution so as to maintain the reaction mixture at a pH in the range of from about 8.0 to 10.5 and while maintaining a temperature in the range of from about 20° to 70° C.

3. In a process for the production of caffeine, the steps comprising the addition with agitation of dimethyl sulfate to an aqueous medium containing a substituted uracil selected from the group consisting of 4-amino-5-formamido uracil and its alkali metal salts, in the ratio of at least 2 molecular proportions of the dimethyl sulfate per molecular proportion of the selected substituted uracil, while adding an aqueous solution of an alkali metal hydroxide, so as to maintain the reaction mixture at a pH within the range of from about 9.0 to 10.0 and a temperature in the range of from about 20° to 50° C., thereby obtaining a first reaction mixture containing 1,3-dimethyl-4-amino-5-formamido uracil, heating said first reaction mixture to a temperature in the range of from about 70° to about 95° C., while maintaining the pH in excess of about 10.5 by the addition of an alkali metal hydroxide in the ratio of approximately 1 molecular proportion of the alkali metal hydroxide per molecular proportion of the selected substituted uracil, thereby obtaining a second reaction mixture containing the alkali metal salt of theophylline, adding dimethyl sulfate to the said second reaction mixture in the ratio of at least 1 molecular proportion of dimethyl sulfate per 1 molecular proportion of the selected substituted uracil, while adding an aqueous solution of an alkali metal hydroxide so as to maintain the reaction mixture at a pH in the range of from about 8.0 to 10.5 and while maintaining a temperature in the range of from about 20° to 70° C.

4. In a process for the production of caffeine, the steps comprising the addition with agitation of dimethyl sulfate to an aqueous medium containing a substituted uracil selected from the group consisting of 4-amino-5-formamido uracil and its alkali metal salts, in the ratio of at least 2 molecular proportions of the dimethyl sulfate per molecular proportion of the selected substituted uracil, while adding an aqueous sodium hydroxide solution, so as to maintain the reaction mixture at a pH within the range of from about 9.0 to 10.0 and a temperature in the range of from about 20° to 50° C., thereby obtaining a first reaction mixture containing 1,3-dimethyl-4-amino-5-formamido uracil, heating said first reaction mixture to a temperature in the range of from about 70° to about 95° C., while maintaining the pH in excess of about 10.5 by the addition of an alkali metal hydroxide in the ratio of approximately 1 molecular proportion of the alkali metal hydroxide per molecular proportion of the selected substituted uracil, thereby obtaining a second reaction mixture containing the alkali metal salt of theophylline, adding dimethyl sulfate to the said second reaction mixture in the ratio of at least 1 molecular proportion of dimethyl sulfate per 1 molecular proportion of the selected substituted uracil, while adding an aqueous sodium hydroxide solution so as to maintain the reaction mixture at a pH in the range of from about 8.0 to 10.5 and while maintaining a temperature in the range of from about 20° to 70° C.

5. In a process for the production of caffeine, the steps comprising the addition with agitation of dimethyl sulfate to an aqueous medium containing a substituted uracil selected from the group consisting of 4-amino-5-formamido uracil and its alkali metal salts, in the ratio of at least 2 molecular proportions of the dimethyl sulfate per molecular proportion of the selected substituted uracil, while adding an aqueous sodium hydroxide solution, so as to maintain the reaction mixture at a pH within the range of from about 9.0 to 10.0 and a temperature in the range of from about 20° to 50° C., thereby obtaining a first reaction mixture containing 1,3-dimethyl-4-amino-5-formamido uracil, heating said first reaction mixture to a temperature in the range of from about 70° to about 95° C., while maintaining the pH in excess of about 10.5 by the addition of sodium hydroxide in the ratio of approximately 1 molecular proportion of sodium hydroxide per molecular proportion of the selected substituted uracil, thereby obtaining a second reaction mixture containing the alkali metal salt of theophylline, adding dimethyl sulfate to the said second reaction mixture in the ratio of at least 1 molecular proportion of dimethyl sulfate per 1 molecular proportion of the selected substituted uracil, while adding an aqueous sodium hydroxide solution so as to maintain the reaction mixture at a pH in the range of from about 8.0 to 10.5 and while maintaining a temperature in the range of from about 20° to 70° C.

6. In a process for the production of caffeine, the steps comprising the addition with agitation of dimethyl sulfate to an aqueous medium containing a substituted uracil selected from the group consisting of 4-amino-5-formamido uracil and its alkali metal salts, in the ratio of at least 2 molecular proportions of the dimethyl sulfate per molecular proportion of the selected substituted uracil, while adding an aqueous potassium hydroxide solution, so as to maintain the reaction mixture at a pH within the range of from about 9.0 to 10.0 and a temperature in the range of from about 20° to 50° C., thereby obtaining a first reaction mixture containing 1,3-dimethyl-4-amino-5-formamido uracil, heating said first reaction mixture to a temperature in the range of from about 70° to about 95° C., while maintaining the pH in excess of about 10.5 by the addition of an alkali metal hydroxide in the ratio of approximately 1 molecular proportion of the alkali metal hydroxide per molecular proportion of the selected substituted uracil, thereby obtaining a second reaction mixture containing the alkali metal salt of theophylline, adding dimethyl sulfate to the said second reaction mixture in the ratio of at least 1 molecular proportion of dimethyl sulfate per 1 molecular proportion of the selected substituted uracil, while adding an aqueous potassium hydroxide solution so as to maintain the reaction mixture at a pH in the range of from about 8.0 to 10.5 and while maintaining a temperature in the range of from about 20° to 70° C.

7. In a process for the production of caffeine, the steps comprising the addition of dimethyl sulfate to an aqueous medium containing a substituted uracil selected from the group consisting of 4-amino-5-formamido uracil and its alkali metal salts, in the ratio of at least 2 molecular proportions of the dimethyl sulfate per molecular proportion of the selected substituted uracil, while adding an aqueous potassium hydroxide solution, so as to maintain the reaction mixture at a pH within the range of from about 9.0 to 10.0 and a temperature in the range of from about 20° to 50° C., thereby obtaining a first reaction mixture containing 1,3-dimethyl-4-amino-5-formamido uracil, heating said first reaction mixture to a temperature in the range of from about 70° to about 95° C., while maintaining the pH in excess of about 10.5 by the addition of potassium hydroxide in the ratio of approximately 1 molecular proportion of potassium hydroxide per molecular proportion of the selected substituted uracil, thereby obtaining a second reaction mixture containing the alkali metal salt of theophylline, adding dimethyl sulfate to the said second reaction mixture in the ratio of at least 1 molecular proportion of dimethyl sulfate per 1 molecular proportion of the selected substituted uracil, while adding an aqueous potassium hydroxide solution so as to maintain the reaction mixture at a pH in the range of from about 8.0 to 10.5 and while maintaining a temperature in the range of from about 20° to 70° C.

FREDERICK COMTE.

REFERENCES CITED

The following references are of record in the file of this patent:

Bobranski et al., J. Am. Pharm. Assn. (scientific edition), 37, 62–4 (Jan. 1948).